US012761930B2

(12) United States Patent
Jakobovits et al.

(10) Patent No.: US 12,761,930 B2
(45) Date of Patent: Oct. 13, 2026

(54) TRAINING PIPELINE FOR TRAINING MACHINE-LEARNED USER INTERFACE CUSTOMIZATION MODELS

(71) Applicant: Google LLC, Mountain View, CA (US)

(72) Inventors: Lisa Michelle Jakobovits, San Carlos, CA (US); Jonathan James Mulligan, San Francisco, CA (US); Mert Dikmen, Belmont, CA (US); Xinlong Bao, Los Altos, CA (US); John Chen, Mountain View, CA (US); Jing Wang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 627 days.

(21) Appl. No.: 18/260,645

(22) PCT Filed: Jun. 14, 2023

(86) PCT No.: PCT/US2023/025261
§ 371 (c)(1),
(2) Date: Jul. 7, 2023

(87) PCT Pub. No.: WO2023/244641
PCT Pub. Date: Dec. 21, 2023

(65) Prior Publication Data

US 2025/0004797 A1 Jan. 2, 2025

Related U.S. Application Data

(60) Provisional application No. 63/351,845, filed on Jun. 14, 2022.

(51) Int. Cl.
*G06F 9/451* (2018.01)
*G06N 20/00* (2019.01)

(52) U.S. Cl.
CPC ............ *G06F 9/451* (2018.02); *G06N 20/00* (2019.01)

(58) Field of Classification Search
CPC ........... G06F 8/38; G06F 9/451; G06N 20/00; G06N 3/084; G06N 3/0895; G06N 3/092;
(Continued)

(56) References Cited

U.S. PATENT DOCUMENTS 9,727,818 B1 8/2017 Liu
2018/0330278 A1* 11/2018 Ghajar .................. G06F 40/289
(Continued)

FOREIGN PATENT DOCUMENTS

WO WO2021112862 6/2021

OTHER PUBLICATIONS

Richardson et al., "Predicting clicks: estimating the click-through rate for new ads", May 8, 2007, WWW '07: Proceedings of the 16th international conference on World Wide Web, pp. 521-529. (Year: 2007).*
International Preliminary Report on Patentability for Application No. PCT/US2023/025261, mailed Dec. 26, 2024, 7 pages.
(Continued)

*Primary Examiner* — Brent Johnston Hoover
(74) *Attorney, Agent, or Firm* — DORITY & MANNING P.A.

(57) ABSTRACT

Example embodiments of the present disclosure provide for an example method. The example method includes obtaining session data descriptive of a plurality of user sessions, the plurality of user sessions respectively including an interaction with an input element rendered at a user device and a request for a resource associated with the input element. The example method includes obtaining, using a first machine-learned model, a plurality of weights associated with the plurality of user sessions by, for a respective user session of the plurality of user sessions: inputting, to the first machine-learned model, data descriptive of one or more
(Continued)

characteristics of the respective user session; and obtaining, from the first machine-learned model, a respective weight of the plurality of weights, the respective weight indicative of an incremental probability of the request conditioned on rendering of the input element. The example method includes updating, based on the plurality of weights, a second machine-learned model to optimize candidate proposals for participation in a real-time content selection process for populating a user interface with one or more selected input elements.

18 Claims, 4 Drawing Sheets

(58) Field of Classification Search
CPC ........... G06Q 30/0201; G06Q 30/0242; G06Q 30/0254; G06Q 30/0271; G06Q 30/0272
See application file for complete search history.

(56) References Cited

U.S. PATENT DOCUMENTS

| | | | | |
|---|---|---|---|---|
| 2019/0080260 | A1 * | 3/2019 | Acuna Agost ..... | G06Q 30/0275 |
| 2021/0103876 | A1 * | 4/2021 | Petrosso ............ | G06Q 10/1053 |
| 2021/0326233 | A1 | 10/2021 | Bao et al. | |
| 2021/0406838 | A1 | 12/2021 | Ramanath et al. | |

OTHER PUBLICATIONS

Bompair et al., "Causal Models for Real Time Bidding with Repeated User Interactions", HAL Open Science, 2021, p. 12 pages.
Lewis et al, "Incrementality Bidding & Attribution", Netflix, 2018, 96 pages.
YouTube, Data-Driven Reserve Prices for Social Advertising Auctions at LinkedIn, https://www.youtube.com/watch?v=e9siq_zDwF4, Retrieved on Jun. 23, 2023, 2 pages.
International Search Report and Written Opinion for PCT/US2023/025261, mailed on Sep. 11, 2023, 11 pages.

* cited by examiner

TRAINING PIPELINE FOR TRAINING MACHINE-LEARNED USER INTERFACE CUSTOMIZATION MODELS

PRIORITY

The present application is based upon and claims the right of priority under 35 U.S.C. § 371 to International Application No. PCT/US2023/025261 filed on Jun. 14, 2023, which claims the benefit of priority of U.S. Provisional Patent Application No. 63/351,845, filed on Jun. 14, 2022. Applicant claims priority to and the benefit of each of such applications and incorporates all such applications herein by reference in their entirety.

FIELD

The present disclosure relates generally to systems and methods for training machine-learned user interface customization models.

BACKGROUND

Computing devices can perform data processing and run machine learning models. Users can engage in various online activities which can result in exposure of information to the user. Subsequent activities by a user can be influenced by prior activity and information exposure.

SUMMARY

Aspects and advantages of embodiments of the present disclosure will be set forth in part in the following description, or can be learned from the description, or can be learned through practice of the embodiments.

In one example aspect, the present disclosure provides for an example system including one or more processors and one or more memory devices storing instructions that are executable to cause the one or more processors to perform operations. In the example system, the operations include obtaining session data descriptive of a plurality of user sessions. In the example system, the plurality of user sessions respectively include an interaction with an input element rendered at a user device and a request for a resource associated with the input element. In the example system, the operations include obtaining, using a first machine-learned model, a plurality of weights associated with the plurality of user sessions by, for a respective user session of the plurality of user sessions: inputting, to the first machine-learned model, data descriptive of one or more characteristics of the respective user session; and obtaining, from the first machine-learned model, a respective weight of the plurality of weights, the respective weight indicative of an incremental probability of the request conditioned on rendering of the input element. In the example system, the operations include updating, based on the plurality of weights, a second machine-learned model to optimize candidate proposals for participation in a real-time content selection process for populating a user interface with one or more selected input elements.

In some embodiments of the example method, updating, based on the plurality of weights, the second machine-learned model includes determining, based on the plurality of weights, one or more parameters of the first machine-learned model. In some embodiments of the example method, updating, based on the plurality of weights, the second machine-learned model includes calibrating, using the one or more parameters, the second machine-learned model.

In some embodiments of the example method, updating, based on the plurality of weights, the second machine-learned model includes generating, based on the plurality of weights, a semi-supervised training dataset including session data descriptive of the plurality of user sessions. In some embodiments of the example method, updating, based on the plurality of weights, the second machine-learned model includes training, using the semi-supervised training dataset, the second machine-learned model.

In some embodiments of the example method, the respective weight corresponds to a reward for updating the second machine-learned model.

In some embodiments of the example method, the data indicative of one or more characteristics of the respective user session includes at least one of: device data and input element data.

In some embodiments of the example method, the device data includes at least one of a browser type, a device identifier, or data indicative of an account associated with the user device.

In some embodiments of the example method, the input element data includes at least one of a form of the input element, a subject matter of the input element, one or more visual characteristics of the input element, or one or more audio characteristics of the input element.

In some embodiments of the example method, the one or more parameters comprise a value indicative of at least one of: one or more total effects, one or more impression query effects, one or more click query effects, one or more calibrated content effects, one or more impression content effects, or one or more click content effects.

In some embodiments of the example method, the plurality of user sessions are associated with at least one of a first user group, a second user group, and a third user group. In some embodiments of the example method, the first user group includes one or more user sessions associated with no rendering of a user input element associated with a first content provider. In some embodiments of the example method, the second user group includes one or more user sessions associated with the rendering of a user input element associated with the first content provider on a user interface and not obtaining data indicative of a user interacting with the user input element. In some embodiments of the example method, the third user group includes one or more user sessions associated with the rendering of a user interface element associated with the first content provider and obtaining data indicative of a user interacting with the user interface element.

In some embodiments of the example method, the one or more parameters are indicative of the one or more impression query effects, corresponding to a difference in conversion probability associated with the second user group and the first user group.

In some embodiments of the example method, the one or more parameters are indicative of the one or more click query effects, corresponding to a difference in conversion probability associated with the third user group and the second user group.

In some embodiments of the example method, the one or more calibrated content effects are determined by taking the difference between a first total effect of the one or more total effects and a sum of a first impression query effect of the one or more impression query effects and a first click query effect of the one or more click query effects.

In some embodiments of the example method, a first total effect is equal to a sum of a first impression query effect of the one or more impression query effects, a first click query effect of the one or more click query effects, and a first calibrated content effect of the one or more calibrated content effects.

In an example aspect, the present disclosure provides for an example computer-implemented method. The example method includes obtaining session data descriptive of a plurality of user sessions. In the example method, the plurality of user sessions respectively include an interaction with an input element rendered at a user device and a request for a resource associated with the input element. The example method includes obtaining, using a first machine-learned model, a plurality of weights associated with the plurality of user sessions by, for a respective user session of the plurality of user sessions: inputting, to the first machine-learned model, data descriptive of one or more characteristics of the respective user session; and obtaining, from the first machine-learned model, a respective weight of the plurality of weights, the respective weight indicative of an incremental probability of the request conditioned on rendering of the input element. The example method includes updating, based on the plurality of weights, a second machine-learned model to optimize candidate proposals for participation in a real-time content selection process for populating a user interface with one or more selected input elements.

In some embodiments of the example method, updating, based on the plurality of weights, the second machine-learned model includes generating, based on the plurality of weights, a semi-supervised training dataset including session data descriptive of the plurality of user sessions. In some embodiments of the example method, updating, based on the plurality of weights, the second machine-learned model includes training, using the semi-supervised training dataset, the second machine-learned model.

In some embodiments of the example method, the example method includes determining the incremental probability of the request conditioned on rendering of the input element is below a threshold incremental probability. In some embodiments of the example method, the example method includes updating, based on the incremental probability being below the threshold incremental probability, the second machine-learned model to avoid proposals for participation in the real-time content selection process for populating the user interface with the input element.

In some embodiments of the example method, the example method includes determining the incremental probability of the request conditioned on rendering of the input element is above a threshold incremental probability. In some embodiments of the example method, the example method includes updating, based on the incremental probability being above the threshold incremental probability, the second machine-learned model to generate proposals for participation in the real-time content selection process for populating the user interface with the input element.

In some embodiments of the example method, the example method includes transmitting, to a user computing device, data to cause the input element to be rendered on a user interface. In some embodiments of the example method, the example method includes obtaining data indicative of user interaction with the input element.

In some embodiments of the example method, the example method includes updating the second machine-learned model based on the data indicative of the user interaction with the input element.

In some embodiments of the example method, the one or more characteristics of the respective user session includes at least one of (i) a user identifier, (ii) a timestamp of an exposure, (ii) an exposure descriptor, (iv) a timestamp of a next chronological exposure, or (v) a count of users performing specified target actions that occurred in an interval defined by the time of the exposure and the next chronological exposure.

In an example aspect, the present disclosure provides for an example non-transitory computer readable medium embodied in a computer-readable storage device and storing instructions that, when executed by a processor, cause the processor to perform operations. In the example non-transitory computer readable medium, the operations include obtaining session data descriptive of a plurality of user sessions. In the example non-transitory computer readable medium, the plurality of user sessions respectively includes an interaction with an input element rendered at a user device and a request for a resource associated with the input element. In the example non-transitory computer readable medium, the operations include obtaining, using a first machine-learned model, a plurality of weights associated with the plurality of user sessions by, for a respective user session of the plurality of user sessions: inputting, to the first machine-learned model, data descriptive of one or more characteristics of the respective user session; and obtaining, from the first machine-learned model, a respective weight of the plurality of weights, the respective weight indicative of an incremental probability of the request conditioned on rendering of the input element. In the example non-transitory computer readable medium, the operations include updating, based on the plurality of weights, a second machine-learned model to optimize candidate proposals for participation in a real-time content selection process for populating a user interface with one or more selected input elements.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
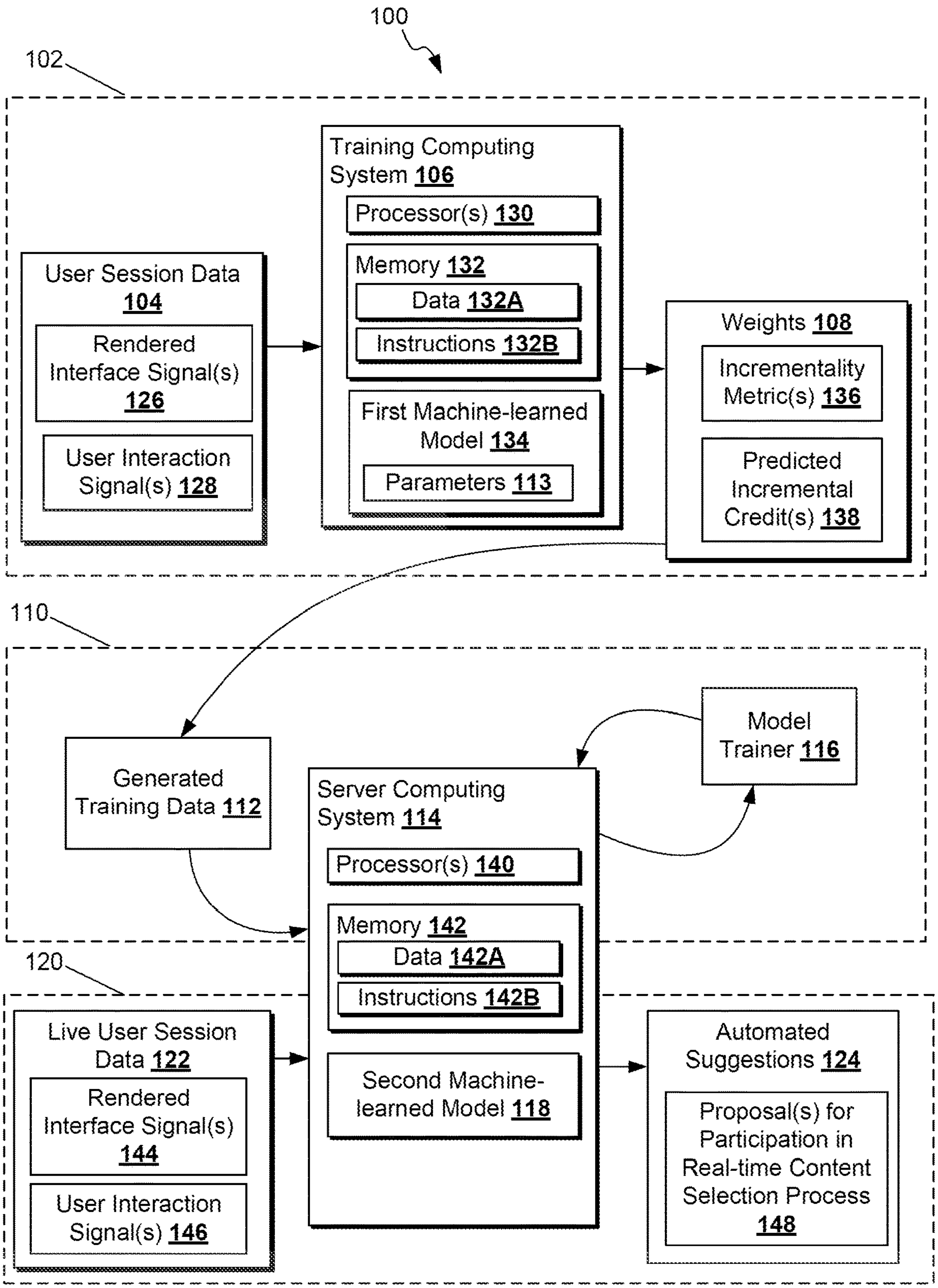
FIG. 1 depicts a block diagram of an example system for training a second machine learned model based on weights generated from a first machine-learned model.

Generally, the present disclosure is directed to systems and methods for an improved training pipeline for training machine-learned user interface customization models. For example, a user interface of a computing device can be populated with one or more input elements related to a task or goal for which a user might use the computing device (e.g., reading the news, searching for new applications or programs, shopping, etc.). For instance, a user interface (e.g., graphical interface, speech interface, etc.) can be populated with input elements that provide an input interface for accessing relevant networked resources. User interfaces can be constrained, however, to only present input elements in particular spaces or slots on the user interface. Advantageously, machine-learned user interface customization models of the present disclosure can provide for improved population of content slots to optimize the functionality of the user interface based on the user's interests or needs. For instance, machine-learned user interface customization models of the present disclosure can learn a probability of the user interacting with an input element on the user interface conditioned on the rendering of that input element on the user interface. In this manner, the content slots of the user interface can be populated with input elements having the greatest impact on and utility for improving the user's access to networked resources.

In some embodiments, systems and methods according to the present disclosure can include predicting an incrementality metric with a first machine-learned model and using the predicted incrementality metric to update a second machine-learned model that participates in a real-time content selection process for populating the user interface(s). For instance, the first machine-learned model can receive, as inputs, signals indicative of the rendering of, and a user interaction with, user interface elements (e.g., a user conversion). Data indicative of such signals can be associated with one or more user sessions. The data indicative of the user session(s) can be obtained by the computing system and input into the first machine-learned model to predict an incremental credit of the impression on a user interacting with the user interface element.

The first machine-learned incrementality based attribution model can output a predicted incrementality using one or more weights (e.g., machine-learned weights). The second machine-learned model can be updated using the predicted incrementality (e.g., using the weights learned to predict the incrementality) to optimize placement of user interface elements based on a predicted interaction by the user. For example, the predicted interaction by a user can be indicative of a target action. In some instances, a target action can include a user signing up for a newsletter, acquiring a particular product, registering with a website/service, adding one or more items to an online cart, downloading a white-paper, and/or any other objective. The second machine-learned model can include, for example, a model configured to generate proposals for participation in a real-time content selection process (e.g., proposals for resource allocation, bids, etc.).

Traditional approaches to conducting real-time content selection generally fail to address the incremental utility of input elements for user interfaces on which they are displayed. For instance, traditional techniques generally provide proposals for content slot population based on a naïve relevance of the proposed input element to user activity. However, such techniques generally fail to account for activity baselines that could render the proposed input element redundant, wasting the computational expense to render input elements that provide little to no incremental utility over the baseline. While some approaches have considered the incremental utility of input elements for accessing networked resources, such approaches have generally relied on extensive manual analysis that requires hand-tuning input element proposal models, leading to inefficiencies (e.g., at scale).

In contrast, the present disclosure provides for using a first machine-learned model to predict the incremental value of rendering an input element, and using the learned output or other parameters of the first machine-learned model to update a second machine-learned model configured to participate in a real-time content selection process. In some embodiments, this structure can provide for automated adaptation of the real-time machine-learned models for improved population of user interface input element slots. For instance, the automated adaptation can be performed at scale, such as individually for a plurality of different input element types or categories. Accordingly, example embodiments of the present disclosure can provide for fine-tuned and bespoke performance improvements obtained efficiently and at scale.

Example aspects of embodiments of the present disclosure can provide a number of technical effects and benefits. For instance, aspects of the described technology can allow for more efficient allocation of computing resources by providing for a customization of a user interface with intelligently suggesting bidding values (e.g., resulting in the selection of input elements to display to a user) based on predicted incremental probability credits associated with a user exposure. The predicted incremental probability credit can provide a basis by which duplication of user interface elements can be reduced. This can help reduce the computation processing and bandwidth usage by decreasing duplication of data transfer and decreasing the amount of data transmitted to a user device (e.g., indicative of one or more user interface elements/input elements) based on whether that input element will have an effect on user conversions. Additionally, or alternatively, based on the input into the machine-learned bidding model, the second machine-learned model can be trained and automatically updated based on new user session data to improve and increase processing and prediction speed, a user interface can be updated to include an input element based on the inputs and outputs of the machine-learned models working in unison. Thus, providing a more accurate prediction of incremental credits.

Example aspects of embodiments of the present disclosure can provide for a number of other technical effects and benefits. For instance, example aspects relate to improving a user's access to networked resources relevant to the user or the user's task or otherwise facilitating an intent of the user when operating a computing system. For instance, by carefully selecting input elements that provide a link or other access to a networked resource and providing those input elements to populate a user interface of a user computing device, the computing device can provide for a more efficient user-machine interface for accomplishing tasks and performing actions that may otherwise require a more complex or indirect sequence of inputs. For instance, instead of being required to access a first network resource providing an index of options, select an option for a vendor, scroll through various items from a vendor, and ultimately select a desired item, a user input element populated on the user interface can directly link to a network resource relating to a user's desired item. By learning to predict the input elements populated on a user interface based on the probability of relevance to achieving a user's task or goal, systems and methods according to the present disclosure can provide for more direct and efficient user interfaces for accomplishing particular tasks for which the user is using the computing device. In this manner, for instance, computational resources used to render multiple different interfaces to achieve a given task can be reduced (e.g., compute cycles, memory resources, electrical resources, etc.). Furthermore, the user-machine interface can be improved by providing for a more efficient and direct user interface flow for accomplishing a given task.

Additionally, or alternatively, example aspects of embodiments of the present disclosure can provide for adapting a user interface of a computing device to items that are actually relevant to a user's tasks or goals for using the computing device. For example, user activity may provide one or more signals that a particular input element would be relevant to accessing a resource of interest or performing a task at hand. However, systems and methods of the present disclosure can, in some embodiments, determine that rendering that particular input element would not be of sufficient incremental value to effectively improve the user interface (e.g., the user already has access to or otherwise is already navigating toward the resource of interest). Thus, systems and methods according to the present disclosure can, in some embodiments, update a machine-learned model for generating a proposal that de-prioritizes transmission of that input element to avoid wasting resources on rendering that input element. For example, when a user is searching for a particular resource of interest, typically both a results page entry and an advertising result directing the user to the same resource may be duplicated on the same page. Embodiments of the present disclosure may prevent such duplication of search and advertising results on the same page.

FIG. 1 depicts an example system 100 for implementing a training pipeline according to example aspects of the present disclosure. In some embodiments, the pipeline can be discussed in terms of multiple states, such as a pipeline including stages of preprocessing, training, and deploying a machine-learned training model. The first stage 102 can include a preprocessing stage. The preprocessing stage can include processing of user session data 104 by a training computing system 106 to generate weights 108. The second stage 110 can include a training stage. The training stage can include inputting generated training data 112 into a server computing system 114. The server computing system can output data to a model trainer 116. The model trainer can update a second machine-learned model 118. The third stage 120 can include a deployment stage. The deployment stage can include execution of the updated second machine-learned model 118. The third stage 120 can include inputting live user session data 122 into a second machine-learned model 118 of a server computing system 114. The third stage can include obtaining output from the second machine-learned model including automated suggestions 124.

Turning to the first stage 102 in more detail, the user session data 104 can include rendered interface signal(s) 126 and/or user interaction signal(s) 128. The rendered interface signal(s) can include data indicative of content rendered on the user device (e.g., input element, input element, etc.). User interaction signal(s) can include data indicative of user interaction with content rendered on the user device (e.g., selection of input element, input received in the form of touch, audio, gesture, etc.). The user session data can include data indicative of the current user session including user input into various fields, historic user data indicative of prior interactions by the user with a particular workflow, etc. The training computing system 106 can include processors 130 and memory 132. The memory can include data 132A and instructions 132B. The training computing system can include a first machine-learned model 134. The one or more processors 130 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 132 can store data 132A and instructions 132B which are executed by the processor 130 to cause the training computing system 106 to perform operations. In some implementations, the training computing system 106 includes or is otherwise implemented by one or more server computing devices (e.g., the server computing system 114).

The first machine-learned model 134 of the training computing system 106 can generate weights 108 in response to receiving user session data 104 as input. The weights can include incrementality metric(s) 136 and/or predicted incremental credit(s) 138. For example, incrementality metric(s) 136 can include a determination of the effect of rendering an item on the likelihood of receiving input(s) indicative of an action. Predicted incremental credit(s) 138 can represent the predicted effect of rendering an item on the likelihood of receiving input(s) indicative of a target action (e.g., the predicted interaction by a user indicative of a target action). In some instances, a target action can include a user signing up for a newsletter, acquiring a particular product, registering with a website/service, adding one or more items to an online cart, downloading a whitepaper, and/or any other objective. The predicted incremental credit(s) 138 represent a probability of receiving input(s) indicative of a target action (e.g., the user interacting with an input element on the user interface) conditioned on the rendering of that input element on the user interface. In this manner, the content slots of the user interface can be populated with input elements having the greatest impact on and utility for improving the user's access to networked resources.

In some implementations, the first machine-learned model 134 can use parameters 113 to determine the weights 108. For example, the parameters 113 of the first machine-learned model 134 can include one or more total effects, one or more impression query effects, one or more click query effects, one or more calibrated content effects, one or more impression content effects, or one or more click content effects. The total effect can be a measurement indicative of the effect of exposure of an input element (e.g., content item) to a user in the user performing a target action (e.g., user 232 performing target action 240). The parameters 113 can be determined using algorithmic techniques used to post-process user session data 104 to train the first machine learned model 134 to predict weights 108.

The weights 108 can be used to generate training data 112. In the second stage 110, the generated training data 112 can be obtained by the server computing system 114. The server computing system 114 includes one or more processors 140 and a memory 142. The one or more processors 140 can be any suitable processing device (e.g., a processor core, a microprocessor, an ASIC, an FPGA, a controller, a microcontroller, etc.) and can be one processor or a plurality of processors that are operatively connected. The memory 142 can include one or more non-transitory computer-readable storage media, such as RAM, ROM, EEPROM, EPROM, flash memory devices, magnetic disks, etc., and combinations thereof. The memory 142 can store data 142A and instructions 142B which are executed by the processor 140 to cause the server computing system 114 to perform operations.

In some implementations, the server computing system 114 includes or is otherwise implemented by one or more server computing devices. In instances in which the server computing system 114 includes plural server computing devices, such server computing devices can operate according to sequential computing architectures, parallel computing architectures, or some combination thereof.

As described above, the server computing system 114 can store or otherwise include the second machine-learned model 118. For example, the second machine-learned model 118 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The training computing device 106, model trainer 116, and/or the server computing system 114 can train the second machine-learned model 118 via interaction with the training computing system 106 and/or model trainer 116 that can be communicatively coupled over a network (e.g., network 218). The training computing system 106 can be separate from the server computing system 114 or can be a portion of the server computing system 114.

The second stage 110 can include a model trainer 116 that trains the second machine-learned model 118 at the server computing system 114 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 116 can perform a number of generalization techniques (e.g., weight decays, dropouts, etc.) to improve the generalization capability of the models being trained.

The model trainer 116 can train the second machine-learned model 118 based on the generated training data 112. The training will help the second machine-learned model 118 to better predict automated suggestions 124 in response to receiving live user session data 122. The generated training data 112 can include information relating to certain user session data 104 and predicted incremental credit(s) 138 based on the user session data 104. The generated training data 112 can include one or more features of a user session. For example, features of a user session can include demographic information (age, gender, location, income) and/or computing device information (display web property, mobile device, desktop device, assistant device, browser being used). The training computing system 106 generates each training sample based at least in part on (i) a user descriptor or identifier, (ii) a timestamp of the exposure, (ii) an event descriptor or exposure descriptor, (iv) a timestamp of the next chronological exposure, (v) a count of customers performing specified target actions that occurred in the interval defined by the time of the exposure and the next exposure and (vi) any other appropriate features. In this manner, for instance, the model trainer 116 can train the second machine-learned model 118 in a supervised or semi-supervised manner.

In some embodiments, the generated training data 112 can include predicted incremental credit(s) 138 optionally without associated user session data 104. For instance, in some embodiments, the model trainer 116 can train the second-machine-learned model 118 in an unsupervised or semi-unsupervised manner. For instance, in some embodiments, the model trainer 116 can train the second machine-learned model 118 using a reinforcement learning technique. For example, the model trainer 116 can update one or more parameters of the second machine-learned model 118 to optimize a feedback signal or reward (e.g., increase a reward, decrease a cost, etc.). For example, in some embodiments, the second machine-learned model 118 can be or otherwise include a reinforcement learning agent. For example, a reinforcement learning agent can be configured to optimize generated proposals (e.g., proposals generated by the second machine-learned model) to obtain a reward. In some embodiments, a reward can be or be based on the predicted incremental credit(s) 138. For example, in some embodiments, the model trainer 116 can train the second machine-learned model 118 to optimize (e.g., increase) an incremental probability of the request conditioned on rendering of the input element.

Figure 4:
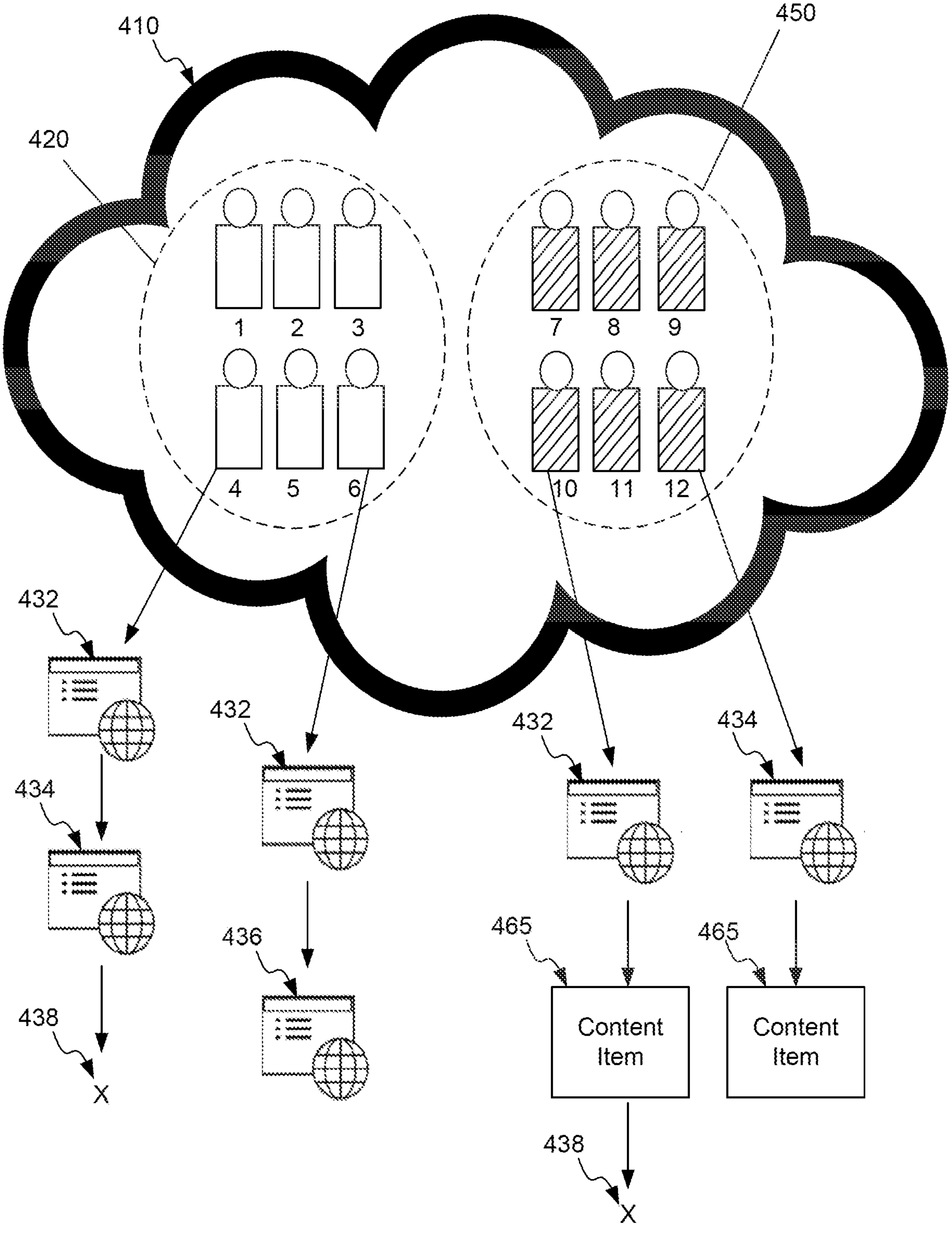
FIG. 4 is a block diagram of an example experiment.

The model trainer can determine which features are valuable for individual advertisers and/or advertisers as a whole. For example, a total effect can be learned from a model (e.g., the first machine-learned model). The first machine-learned model 134 can learn a total effect. The first machine-learned model 134 can be calibrated by taking the difference between a total effect and a query effect to get a calibrated content effect. The total effect can be equal to the sum of a query effect and the calibrated content effect. The query effect can be equal to the sum of an impression content effect and a click content effect. For example, as depicted in FIG. 4, there can be some users who have no exposure to a content item (e.g., a user device associated with the user does not render content item 465), some users who will be exposed to a content item (e.g., a user device associated with the user renders content item 465) but will not click (e.g., no data indicative of user interaction is received), and users who will be exposed to a content item (e.g., a user device associated with the user renders content item 465) and will click (e.g., data indicative of user interaction is received). An impression query effect can be determined by taking the baseline difference between users who are exposed to a content item (e.g., impression of content item 465, rendering content item 465 on a user device associated with the user) but will not click (e.g., no data indicative of user interaction is received) and a user who will not see a content item (e.g., content item 465, no rendering of content item 465 on a user device associated with the user). A click query effect can be determined by taking the baseline difference between users who will be exposed to a content item (e.g., content item 465, rendering content item 465 on a user device associated with the user) and will click (e.g., data indicative of user interaction is received) and the users who will be exposed to a content item (e.g., content item 465, rendering content item 465 on a user device associated with the user) but will not click (e.g., no data indicative of user interaction is received).

The total effect can be predicted by the first machine-learned model. The parameters 113 of the first machine-learned model 134 can be used to calibrate the second machine-learned model 118. For example, the system can calibrate the second machine-learned model 118 using one or more parameters. The one or more parameters can include a value indicative of at least one of: one or more total effects, one or more impression query effects, one or more click query effects, one or more calibrated content effects, one or more impression content effects, or one or more click content effects. The plurality of user sessions can be associated with at least one of a first user group, a second user group, and a third user group. The first user group can include one or more user sessions associated with no rendering of a user input element associated with a first content provider. The second user group can include one or more user sessions associated with the rendering of a user input element associated with the first content provider on a user interface and not obtaining data indicative of a user interacting with the user input element. The third user group can include one or more user sessions associated with the rendering of a user interface element associated with the first content provider and obtaining data indicative of a user interacting with the user interface element.

In some embodiments the one or more parameters can be indicative of the one or more impression query effects. The impression query effects can correspond to a difference in conversion probability associated with the second user group and the first user group. The one or more parameters can be indicative of one or more click query effects. The click query effects can correspond to a difference in conversion probability associated with the third user group and the second user group. The one or more calibrated content effects can be determined by taking the difference between a first total effect of the one or more total effects and a sum of a first impression query effect of the one or more impression query effects and a first click query effect of the one or more click query effects. A first total effect can be equal to a sum of a first impression query effect of the one or more impression query effects, a first click query effect of the one or more click query effects, and a first calibrated content effect of the one or more calibrated content effects.

The first machine-learned model 134 can continuously generate weights as user sessions occur. Thus, the first machine-learned model can be in an "always-on" experiment state. The system 100 can continuously generate training data 112 to be used by the model trainer 116 to train the second machine-learned model.

In the third stage 120, the updated second-machine learned model 118 can be deployed. For example, live user session data 122 can be input into the second machine-learned model 118. The live user session data 122 can include rendered interface signal(s) 144 and/or user interaction signal(s) 146. The second machine-learned model 118 can output automated suggestions 124. The automated suggestions 124, for example, can include proposal(s) for participation in real-time content selection process 148.

The live user session data 122 can include rendered interface signal(s) 144 and/or user interaction signal(s) 146. The rendered interface signal(s) can include data indicative of content rendered on the user device (e.g., input element, input element, etc.). User interaction signal(s) can include data indicative of user interaction with content rendered on the user device (e.g., selection of input element, input received in the form of touch, audio, gesture, etc.). User session data 122 can include one or more features of an associated user session.

The second machine-learned model 118 can receive the live user session data 122 and in response output automated suggestions 124. The automated suggestions 124, for example, can include proposal(s) for participation in real-time content selection process 148. The automated suggestions 124 can be determined using the learned output or other parameters of the first machine-learned model 134 to update the second machine-learned model 118 configured to participate in a real-time content selection process.

For example, the second machine-learned model 118 can predict an incremental credit based on the live user session data 122. The system can generate automated suggestions 124 based on the characteristics of the live user session data 122 (e.g., features associated with the session). These suggestions can include one or more proposals for participation in real-time content selection process 148 (e.g., real-time bidding). In some embodiments, this structure can provide for automated adaptation of the real-time machine-learned models for improved population of user interface input element slots. For example, by presenting input elements (e.g., content items) that a user is more likely to interact with, the limited user interface (e.g., screen space) can be used to optimize user input. Thus, the system can adapt a user interface of a computing device to present items that are actually relevant to a user's tasks or goals for using the computing device. For example, user activity may provide one or more signals that a particular input element would be relevant to accessing a resource of interest or performing a task at hand. However, systems and methods of the present disclosure can, in some embodiments, determine that rendering that particular input element would not be of sufficient incremental value to effectively improve the user interface (e.g., the user already has access to or otherwise is already navigating toward the resource of interest). Thus, systems and methods according to the present disclosure can, in some embodiments, update a machine-learned model for generating a proposal that de-prioritizes transmission of that input element to avoid wasting resources on rendering that input element.

Figure 2:
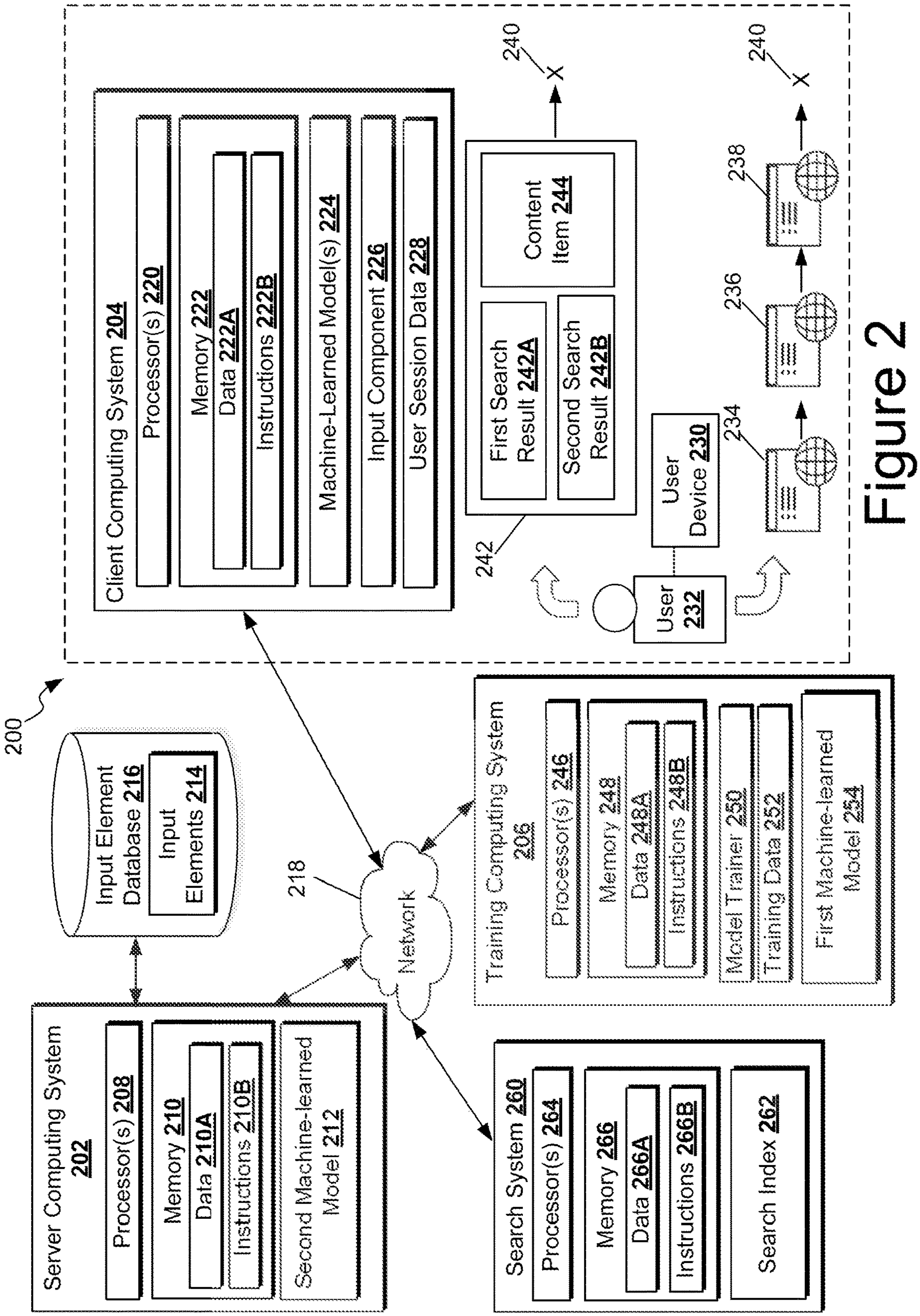
FIG. 2 depicts a block diagram of an example system for incrementality based bidding according to example embodiments of the present disclosure.

FIG. 2 depicts one example system 200 for an improved training pipeline for training machine-learned user interface customization models. The example system 200 can include a server computing system 202, a client computing system 204, and/or a training computing system 206.

The server computing system 202 can include one or more processor(s) 208. The server computing system 202 can include memory 210. The memory 210 can include data 210A and/or instructions 210B. The server computing system 202 can include a second machine-learned model 212. The one or more processors 208 can be any suitable processing device (e.g., a processor core, a microprocessor, an ASIC, an FPGA, a controller, a microcontroller, etc.) and can be one processor or a plurality of processors that are operatively connected. The memory 210 can include one or more non-transitory computer-readable storage media, such as RAM, ROM, EEPROM, EPROM, flash memory devices, magnetic disks, etc., and combinations thereof. The memory 210 can store data 210A and instructions 210B which are executed by the processor 208 to cause the server computing system 202 to perform operations.

The server computing system 202 can obtain input elements 214 from input element database 216. The input elements can include, for example, content items. Input elements can be data that causes the presentation of a content item at a client device (e.g., user device associated with client computing system 204). Examples of input elements include advertisements webpages, word processing documents, portable document format (PDF) documents, images, videos, search results pages, and feed sources. Native applications (e.g., "apps"), such as applications installed on mobile, tablet, or desktop computing devices are also examples of input elements. Input elements 214 can be provided to user devices (e.g., user device 230) by server computing system 202. For example, server computing system 202 can include servers that host publisher websites. In this example, user 232 can initiate a request for a given publisher webpage, and server computing system 202 can respond to the request by sending machine executable instructions that initiate presentation of the given webpage at user device 230.

In another example, the server computing system 202 can include content servers including app servers from which user devices (e.g., user device 230) can download apps. In this example, the user device 230 can download files required to install an app at the user device 230, and then execute the downloaded app locally. The app can present organic content, e.g., content specified by a developer of the app, and in some cases can also present one or more digital components (e.g., input element 214, content created/distributed by a third party) that are obtained from a digital component server (e.g., input element database 216), and inserted into the app while the app is being executed at the user device 230.

Input elements 214 can include a variety of content. For example, an input element can include static content (e.g., text or other specified content) that is within the input element itself and/or does not change over time. Input elements can also include dynamic content that may change over time or on a per-request basis. For example, a publisher of a given input element can maintain a data source that is used to populate portions of the input element. In this example, the given input element can include a tag or script that causes the user device 230 to request content from the data source when the given input element is processed (e.g., rendered or executed) by a user device 230. The user device 230 integrates the content obtained from the data source into the given input element to create a composite input element including the content obtained from the data source.

In some implementations an input element can include an input field. An input element can be configured to obtain user input via a user interface and generate user input signals. The input element can be configured to obtain user input signals and transmit (e.g., via a computing system) the user input signals to a server for processing. In some embodiments an input element could include a text box, touch screen, or other interactive user interface element. For example, the input element can include a clickable URL, clickable link, an item that when interacted with, causes the server to transmit additional content to the user (e.g., direct the user to an additional website).

In some embodiments, a given input element can include a digital component tag or digital component script that references the server computing system 202. In these situations, the digital component tag or digital component script is executed by the user device 230 when the given input element is processed by the user device 230. Execution of the digital component tag or digital component script configures the user device 230 to generate a request for digital components (referred to as a "component request"), which is transmitted over the network 218 to the server computing system 202. For example, the digital component tag or digital component script can enable the user device 230 to generate a packetized data request including a header and payload data. The component request can include event data specifying features such as a name (or network location) of a server from which the digital component is being requested, a name (or network location) of the requesting device (e.g., the user device 230), and/or information that the digital component distribution system can use to select one or more digital components provided in response to the request. A component request is transmitted, by the user device 230, over the network 218 (e.g., a telecommunications network) to a server of the server computing system 202.

The component request can include event data specifying other event features, such as the input element being requested and characteristics of locations of the input element at which digital component can be presented. For example, event data specifying a reference (e.g., URL) to an input element (e.g., webpage) in which the digital component will be presented, available locations of the input elements that are available to present input elements (e.g., digital components, content items), sizes of the available locations, and/or media types that are eligible for presentation in the locations can be provided to the server computing system 202. Similarly, event data specifying keywords associated with the input element ("input element keywords") or entities (e.g., people, places, or things) that are referenced by the input element can also be included in the component request (e.g., as payload data) and provided to the server computing system 202 to facilitate identification of input elements (e.g., digital components, content items) that are eligible for presentation with the input element. The event data can also include a search query that was submitted from the user device 230 to obtain a search results page, and/or data specifying search results and/or textual, audible, or other visual content that is included in the search results.

Component requests can also include event data related to other information, such as information that a user of the user device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests can be transmitted, for example, over a packetized network, and the component requests themselves can be formatted as packetized data having a header and payload data. The header can specify a destination of the packet and the payload data can include any of the information discussed above.

The server computing system 202, which can include one or more digital component distribution servers, chooses input elements (e.g., digital components, content items) that will be presented with the given input element in response to receiving the component request and/or using information included in the component request. In some implementations, a digital component is selected in less than a second to avoid errors that could be caused by delayed selection of the digital component. For example, delays in providing input elements (e.g., digital components, content items) in response to a component request can result in page load errors at the user device 230 or cause portions of the input element to remain unpopulated even after other portions of the input element are presented at the user device 230. Also, as the delay in providing the digital component to the user device 230 increases, it is more likely that the input element will no longer be presented at the user device 230 when the digital component is delivered to the user device 230, thereby negatively impacting a user's experience with the input element. Further, delays in providing the digital component can result in a failed delivery of the digital component, for example, if the input element is no longer presented at the user device 230 when the digital component is provided.

To facilitate searching of input elements, the environment 200 can include a search system 260 that identifies the input elements by crawling and indexing the input elements (e.g., indexed based on the crawled content of the input elements). Data about the input elements can be indexed based on the input element with which the data are associated. The indexed and, optionally, cached copies of the input elements are stored in a search index 262 (e.g., hardware memory device(s)). Data that are associated with an input element is data that represents content included in the input element and/or metadata for the input element.

The search system 260 can include one or more processor(s) 264 and memory 266. The one or more processors 264 can be any suitable processing device (e.g., a processor core, a microprocessor, an ASIC, an FPGA, a controller, a microcontroller, etc.) and can be one processor or a plurality of processors that are operatively connected. The memory 266 can include one or more non-transitory computer-readable storage media, such as RAM, ROM, EEPROM, EPROM, flash memory devices, magnetic disks, etc., and combinations thereof. The memory 266 can store data 266A and instructions 266B which are executed by the processor 264 to cause the search system 260 to perform operations.

User devices 230 can submit search queries to the search system 260 over the network 218. In response, the search system 260 accesses the search index 262 to identify input elements that are relevant to the search query. The search system 260 identifies the input elements in the form of search results and returns the search results to the user device 230 in search results page. A search result is data generated by the search system 260 that identifies an input element that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the user device 230. Another example search result can include a title of streaming media, a snippet of text describing the streaming media, an image depicting contents of the streaming media, and/or a URL to a location from which the streaming media can be downloaded to the user device 230. Like other input elements search results pages can include one or more slots in which digital components (e.g., advertisements, video clips, audio clips, images, or other digital components) can be presented. As described above, a variety of online content can be presented to users as they interact with online resources available through the Internet. That online content can generally be classified as organic content or digital components.

Organic content is content that is specified by and/or provided by an owner or administrator of the online resource in which the content is being presented. Examples of organic content include search results provided by a search engine, and content presented in a web page provided by a publisher. In each of these examples, the content presented is specified by the entity providing the online resource and is therefore considered first party content. For example, the search engine identifies online resources relevant to a submitted search query, generates search results identifying those relevant resources, and generates a search results page (in the domain of the search engine) that includes the search results generated by the search engine. Thus, the search results are generated by the search engine, and presented in the search results page generated by the search engine, thereby making the search results first party content, and thus, organic content. Similarly, when a user visits a particular web page, that web page will include content specified by and/or generated by the publisher of that web page, which is also considered first party content, also making it organic content for purposes of the present discussion.

For purposes of this discussion, digital components are considered third party content because the digital components are created by and/or provided by an entity that differs from the entity providing the online resource on which the digital component is presented. In the context of a search results page, a digital component that includes third party content can be a digital component that is selected for inclusion in the online resource at the time the online resource is presented (e.g., weather data, stock data, or advertisements). For example, a digital component (e.g., presenting current weather conditions, stock prices, or advertisements) can be selected by a third party (e.g., a different domain than the search engine domain) at the time a search results page is generated, and provided for presentation within the search results page. As discussed above, digital components presented with a search results page can be selected by an entity other than the entity providing the search results page based, at least in part, on the search query submitted by the user. In the context of a web page provided by a publisher (e.g., a blog, news web page, weather web page, stock information web page), a digital component provided by a third party that differs from the publisher of the web page can be selected for presentation in the web page when the web page is requested by a client device. The digital components selected for presentation with a given web page can be selected, for example, based on organic content of the given web page and/or characteristics of the user (e.g., interests, profile information, etc.) visiting the given web page.

Each exposure to an input element (e.g., content) can have an effect on a user's future online (or offline) activity. For example, a user that sees content related to a particular brand of shoe (e.g., reviews, news articles, or advertisements) may be more likely to acquire that particular brand of shoes than the user would have been absent from the exposures. In some situations, it can be advantageous to be able to quantify the effects of different content exposures as they relate to a user subsequently performing some specified target action 240.

In some implementations, the target action can be specified by a digital component provider. For example, a digital component provider can specify that the target action as one or more of the user downloading a white paper, navigating to at least a given depth of a website, viewing at least a certain number of web pages, spending at least a predetermined amount of time on a website or web page, completing a website registration process, subscribing to a digital service, adding items to shopping cart or purchasing a product. When a user performs a specified target action, performance of the specified target action can be referred to as a conversion.

A user's performance of the specified target action is often preceded by a series of exposures to online content (e.g., rendering of a content item on a user device associated with a user). For example, assume that the user 232 has interest in a particular camera and wants to know more about the camera. Further assume that a digital component provider that distributes digital components (e.g., content items, input elements) containing information about the particular camera has specified the target action 240 as acquisition of the particular camera.

In this example, the user 232 may search for information about the particular camera on the user device 230 by submitting a search query to the search system 260 over the network 218. The search system 260 identifies search results responsive to the search query, and returns the search results to the user device 230 for display, which is considered an exposure of organic content about the particular camera to the user 232 (e.g., assuming that digital components about the particular camera are not presented on the search results page). The user 232 viewing the search results at the user device 230 can visit websites 234, 236, and 238 (e.g., by clicking on several of the search results) which each contain information about the particular camera. Each of these visits to the websites by the user 232 can also be considered exposures of organic content to the user 232. Assuming that the user 232 ultimately acquires the particular camera (i.e., performs the specified target action 240), each of these exposures to organic content, referred to as organic events, will have contributed to the user's performance of the specified target action 240, and the relative contribution of these organic exposures can be quantified as described in more detail below.

In the example, above, it is assumed that the user 232 was exposed to organic content about the particular camera prior to performing the specified target action 240, but that the user 232 was not exposed to a digital component about the particular camera (e.g., a specified type of digital component). Exposures to digital components can also contribute to the user's performance of the specified target action 240. For example, assume that prior to performing the specified target action 240, the user 232 performs another search. Further assume that, in response to this search, the search system 260 returns a search results page 242 including search results (e.g., first search result 242A and second search result 242B), and a digital component server provides a digital component 244 (e.g., an input element) about the particular camera for presentation with the search results.

In this example, when the user 232 subsequently performs the specified target action 240 (e.g., acquiring the particular camera), the user's exposure to the digital component 244 will also have contributed to the performance of that specified target action 240. However, it is not readily apparent, not directly observable, and difficult to determine the level of the effect of the digital component exposure as it relates to the user's subsequent performance of the specified target action 240. Moreover, it is not readily apparent from raw data related to content exposures alone how to differentiate between the contributions of organic exposures and the contributions of exposures to digital components as they relate to influencing the user's subsequent performance of the target action 240. As such, it can be difficult to effectively and efficiently distribute content to users, particularly as it relates to input elements (e.g., digital components).

To determine the effects of content exposures as they relate to users performing a specified target action 240, the environment 200 can include a training computing system 206 with a first machine-learned model 254 which is configured to evaluate content exposures, and determine the level of contribution of each of those content exposures to users' subsequent performance of a specified target action 240 and/or the probability that by presenting input elements (e.g., content exposures) that a user is more likely to interact with (e.g., the system is more likely to obtain data indicative of a user interaction with a content item), the limited user interface (e.g., screen space) can be used to optimize user input. Thus, the system can adapt a user interface of a computing device to present items that are actually relevant to a user's tasks or goals for using the computing device. For example, user activity may provide one or more signals that a particular input element would be relevant to accessing a resource of interest or performing a task at hand. This information can be used to determine the performance of specified type of digital components (e.g., input elements) distributed by the component distribution system, which can be used to improve the relevance of content presented to users, for example, by modifying transmission criteria that control when, where, or how digital components are transmitted for presentation to users. However, systems and methods of the present disclosure can, in some embodiments, determine that rendering that particular input element would not be of sufficient incremental value to effectively improve the user interface (e.g., the user already has access to or otherwise is already navigating toward the resource of interest).

As described in more detail below, the training computing system 206 is configured to implement data collection techniques that enable the training computing system 206 to learn relationships between user sessions and baseline performance levels of a specified target action 240 (e.g., levels at which users having certain attributes perform the specified target interaction). These relationships can be referred to as a baseline action model that can output a baseline performance level based on attributes input to the system. This baseline performance model can be a stand-alone model, or incorporated into a more complex model structure that also takes into account other data, as described in more detail below.

The baseline performance levels represent the level of performance of the specified target action 240 in the absence of users being exposed to digital components of a specified type. For example, a particular baseline performance level can be created to represent a rate at which users acquire a particular type of shoe when those users have not been exposed to digital components distributed for a seller of that particular type of shoe.

In a specific example, the baseline performance measure can be indicative of the portion of users having a certain set of attributes that will acquire the particular type of shoe without those users being exposed to advertisements for that particular type of shoe.

The data collection techniques implemented by the training computing system 206 also enable the training computing system 206 and the first machine-learned model 254 to model the effects of various content exposures over time as it relates to users subsequently performing the specified target action 240. For example, the training computing system 206 can create a model that quantifies an initial change in the portion of users that perform the specified target action 240 immediately following exposure to a particular type of content (e.g., organic content or a digital component), and that represents the decay of that initial change over time (e.g., toward the baseline performance measure), as described in more detail below. This ability to delineate between the baseline performance level and the remaining effects of various content exposures over time enables the training computing system 206 to determine the incremental effects of each content exposure remaining at the time the specified target action 240 is performed, thereby providing an improved attribution model relative to traditional attribution models that are not able to delineate the relative contributions of each content exposure that remain when the specified target action 240 is performed The server computing system 202 can communicate with other systems via network 218. For example, the server computing system 202 can communicate with the client computing system 204. The client computing system 204 can include one or more processors 220. The one or more processors 220 can be any suitable processing device (e.g., a processor core, a microprocessor, an ASIC, an FPGA, a controller, a microcontroller, etc.) and can be one processor or a plurality of processors that are operatively connected. The memory 222 can include one or more non-transitory computer-readable storage media, such as RAM, ROM, EEPROM, EPROM, flash memory devices, magnetic disks, etc., and combinations thereof. The memory 222 can store data 222A and instructions 222B which are executed by the processor 220 to cause the client computing system 204 to perform operations.

In some implementations, the client computing system 204 can store or include one or more machine-learned models 224. For example, the machine-learned models 224 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models.

In some implementations, the one or more machine-learned models 224 can be received from the server computing system 202 over network 218, stored in the client computing system memory 222, and then used or otherwise implemented by the one or more processors 220. In some implementations, the client computing system 204 can implement multiple parallel instances of a single machine-learned model 224 (e.g., to perform parallel updated notification elements across multiple instances of user input data obtained via a structured user interface).

The client computing system 204 can also include one or more user input components 226 that receives user input. In some embodiments, the user input components 226 can include the user input elements 214. For example, the user input component 226 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. In some embodiments, the client computing system 204 can include user session data 228 indicative of a user session with a user device (e.g., user device 230).

Figure 3:
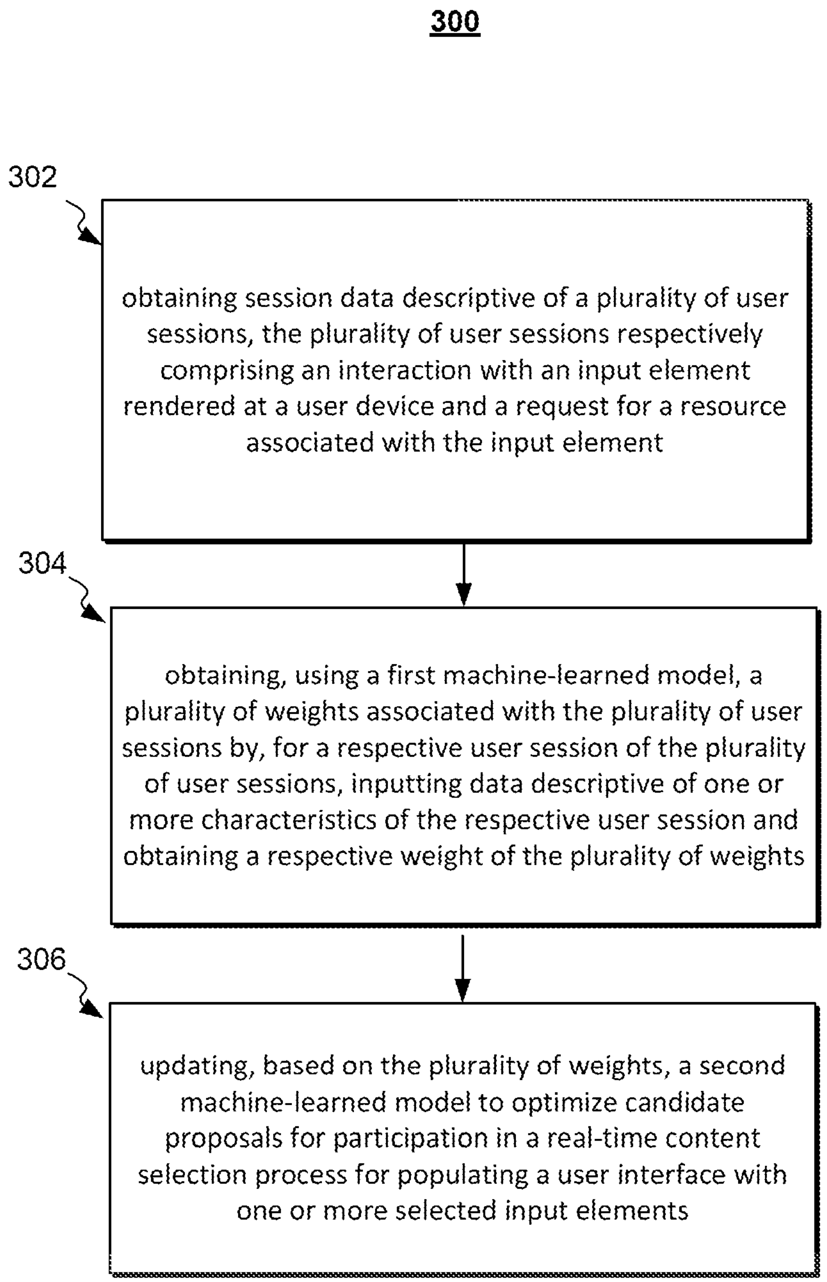
FIG. 3 depicts a flowchart of an example method according to example embodiments of the present disclosure.

FIG. 3 depicts a flow chart diagram of an example method 300 for a training pipeline for training machine-learned user interface customization models. Although FIG. 3 depicts steps performed in a particular order for purposes of illustration and discussion, the methods of the present disclosure are not limited to the particularly illustrated order or arrangement. The various steps of method 300 can be omitted, rearranged, combined, or adapted in various ways without deviating from the scope of the present disclosure.

At (302), method 300 can include obtaining session data descriptive of a plurality of user sessions, the plurality of user sessions respectively comprising an interaction with an input element rendered at a user device and a request for a resource associated with the input element. As described herein, the operations performed by the computing system can include obtaining session data descriptive of a plurality of user sessions. The plurality of user sessions can respectively include an interaction with a user interface element rendered at a user device and a request for a resource associated with the user interface element.

At (304), method 300 can include obtaining, using a first machine-learned model, a plurality of weights associated with the plurality of user sessions by, for a respective user session of the plurality of user sessions, inputting data descriptive of one or more characteristics of the respective user session and obtaining a respective weight of the plurality of weights. As described herein, the operations performed by the system can include obtaining, using a first machine-learned model, a plurality of weights associated with the plurality of user sessions.

In some implementations, the plurality of weights associated with the plurality of user sessions can be obtained by, for a respective user session of the plurality of user sessions: inputting, to the first machine-learned model, data descriptive of one or more characteristics of the respective user session; and obtaining, from the first machine-learned model, a respective weight of the plurality of weights, the respective weight indicative of an incremental probability of the request conditioned on rendering of the input element. The data indicative of one or more characteristics of the respective user session can include at least one of: device data or input element data.

The device data can include at least one of a browser type, a device identifier, or data indicative of an account associated with the user device. For instance a browser type can include a desktop browser, mobile browser, application interface, or other browser. The device identifier can include an identifier associated with a device.

The input element data can include at least one of a form of the input element, a subject matter of the input element, one or more visual characteristics of the input element, or one or more audio characteristics of the input element. For instance, the input element can include a selectable creative asset. The creative asset can include an advertisement or other form of content comprising informative information. In response to obtaining data indicative of user selection of the input element, the computing system can automatically update the user interface to present an additional interface element associated with the content. For instance, the computing system can update the user interface to a website associated with the input element.

By way of example, the one or more characteristics of the respective user session can include at least one of (i) a user identifier, (ii) a timestamp of an exposure, (ii) an exposure descriptor, (iv) a timestamp of a next chronological exposure, or (v) a count of users performing specified target actions that occurred in an interval defined by the time of the exposure and the next chronological exposure. A user identifier can be an identifier associated with a device. A timestamp of an exposure can be indicative of a day or time associated with the display of a content item via a user interface. An exposure descriptor can be data indicative of the context or content of the exposure. A timestamp of a next chronological exposure can be a day or time associated with an exposure after a first measure exposure. The count of users performing specified target actions that occurred in an interval defined by the time of the exposure and the next chronological exposure can include a count of conversions or other target actions performed by a plurality of users. For instance, the computing system can obtain data indicative of a number of clicks, purchases, or other target actions performed by one or more device identifiers over an amount of time. The association between the timestamps of exposure and the target action being performed can be used to determine the impact of successive chronological exposures on the target action being performed.

At (306), method 300 can include updating, based on the plurality of weights, a second machine-learned model to optimize candidate proposals for participation in a real-time content selection process for populating a user interface with one or more selected input elements. As described herein the operations performed by the computing system can include updating, based on the plurality of weights, a second machine-learned model to optimize candidate proposals for participation in a real-time content selection process for populating a user interface with one or more selected input elements.

In some implementations, updating the second machine-learned model can include determining, based on the plurality of weights, one or more parameters of the first machine-learned model and calibrating, using the one or more parameters, the second machine-learned model.

In some instances, updating the second machine-learned model can include generating, based on the plurality of weights, a semi-supervised training dataset comprising session data descriptive of the plurality of user sessions. The system can train, using the semi-supervised training dataset, the second-machine learned model. For instance, a respective weight can correspond to a reward for updating the machine-learned model.

In some implementations, the data indicative of one or more characteristics of the respective user session can include at least one of: device data and input element data. The device data can include at least one of a browser type, a device identifier, or data indicative of an account associated with the user device. The input element data can include at least one of a form of the input element, a subject matter of the input element, one or more visual characteristics of the input element, or one or more audio characteristics of the input element.

In some implementations, the one or more parameters can include a value indicative of at least one of: one or more total effects, one or more impression query effects, one or more click query effects, one or more calibrated content effects, one or more impression content effects, or one or more click content effects. For instance, the parameters can be indicative of an incrementality of effect associated with each respective effect. For example, the incrementality of effect can be indicative of an indication of but—for the event, would the target action have been performed.

In some embodiments, the plurality of user sessions are associated with at least one of a first user group, a second user group, and a third user group. The first user group can include one or more user sessions associated with no rendering of a user input element associated with the first content provider (e.g., no advertisement being shown). The second group can include one or more user sessions associated with the rendering of a user input element associated with the first content provider on a user interface and not obtaining data indicative of a user interacting with the user input element (e.g., an advertisement being shown and the user not clicking on the advertisement). The third user group can include one or more user sessions associated with the rendering of a user interface element associated with the first content provider and obtaining data indicative of a user interacting with the user interface element (e.g., an advertisement being shown and the user clicking the advertisement). For instance, the plurality of user sessions can be indicative of an ablation experiment to determine the incremental effect of exposure to a user input element and the performance of a target action (e.g., as described in FIG. 4).

For instance, the one or more parameters can be indicative of the one or more impression query effects. The one or more impression query effects can correspond to a difference in conversion probability associated with the second user group and the first user group.

For instance, the one or more parameters can be indicative of one or more click query effects. The one or more click query effects can correspond to a difference in conversion probability associated with the third user group and the second user group.

As described herein, the one or more calibrated content effects can be determined by taking the difference between a first total effect of the one or more total effects and a sum of a first impression query effect of the one or more impression query effects and a first click query effect of the one or more click query effects. Such that a calibrated content effect is equal to the difference between a first total effect and the sum of an impression query effect and a click query effect.

As described herein, a first total effect is equal to a sum of a first impression query effect of the one or more impression query effects, a first click query effect of the one or more click query effects, and a first calibrated content effect of the one or more calibrated content effects. Such that a total effect is equal to the sum of an impression query effect, a click query effect, and a calibrated content effect.

Additionally, or alternatively, the method 300 can include determining the incremental probability of the request conditioned on rendering of the input element is below a threshold incremental probability. The system can update, based on the incremental probability being below the threshold incremental probability, the second machine-learned model to avoid proposals for participation in the real-time content selection process for populating the user interface with the input element.

Additionally, or alternatively, the method 300 can include determining the incremental probability of the request conditioned on rendering of the input element is above a threshold incremental probability. The system can update, based on the incremental probability being above the threshold incremental probability, the second machine-learned model to generate proposals for participation in the real-time content selection process for populating the user interface with the input element.

In some implementations, method 300 can include transmitting, to a user computing device, data to cause the input element to be rendered on a user interface (e.g., of the user device). The method can include obtaining data indicative of user interaction with the input element. By way of example, the second machine-learned model can be updated based on the data indicative of the user interaction with the input element.

FIG. 4 is a block diagram illustrating an example ablation experiment, which can be implemented by an ablation experiment apparatus. The ablation experiment is performed using a set of users 410. In such an implementation, a set of control users 420 are created for a specified period of time during which the set of control users 420 are not served one or more specified types of input elements (e.g., digital components, content items) thereby preventing exposure to input elements (e.g., digital components, content items) that are being evaluated. For example, the set of control users 420 can be marked as being part of a control group for a particular entity that distributes input elements (e.g., digital components, content items), and in this example, a user's inclusion in the control group can prevent those users from being exposed to input elements (e.g., digital components, content items) distributed by that particular entity, thereby preventing those input elements (e.g., digital components, content items) from affecting subsequent actions performed by the users in the control group 420.

Ablation experiments also define a set of exposed users 450 for the specified period of time. Unlike the set of control users, the set of exposed users 450 are served with the specified type of digital component thereby ensuring that the set of exposed users 450 are exposed to the specified type of digital content (e.g., input elements distributed by the particular entity). For example, the set of users 410 includes the set of control users 420, which can include users 1-6. The set of users 410 also includes a set of exposed users 450 which include users 7-12. Each user 1-6 in the group of control user may experience organic exposures but will not experience third party exposures of a specified type of input elements (e.g., digital components and/or content items provided by a particular entity and/or related to a particular topic, object, product, or service). Users 7-12 in the set of exposed users 450 gets exposed to the specified type of content item 465 (e.g., input elements (e.g., digital components, content items) provided by the particular entity).

In some implementations, the users in the set of control users 420 and the set of exposed users 450 are selected randomly from the users in the set of users 410. In other implementations, this random selection process can be controlled using certain conditions. For example, the baseline model can be trained to determine the performance level for a particular age group of users. In such implementations, the ablation experiment apparatus can select users from the particular age group from the set of users 410 and then randomly assign the selected users to either of the set of control users 420 or the set of exposed users 450.

In some implementations, exposure data (e.g., organic exposure data and/or third-party exposure data) are collected for the set of control users and the set of exposed users. For example, the exposure data collected for user 4 in the set of control users 420 can specify that user 4 was exposed to a first website 432 and a second website 434, both of which are organic exposures. According to the collected data, after getting exposed to the first website 432 and the second website 434, user 4 performs the specified target action 438. Continuing with this example, the exposure data can also indicate that, during the specified period, user 6 did not perform the specified target action 438 following exposure to the first website 432 and a third website 436. This exposure data can be used in training samples that include an identifier to the type of exposure (e.g., organic or third party), the time of exposure, duration of exposure, user attributes and whether or not the specified target action was performed within the specified time period.

Similarly, from the set of exposed users 450, user 10 performs the specified target action 438 after an initial exposure to the first website 432, and a subsequent third-party exposure to a content item 465 (e.g., an exposure to a digital component provided by a particular entity and/or related to a particular topic, service, or product). In the present example, user 12 does not perform the specified target action 438 following an initial exposure to the second website 434 and a subsequent third-party exposure to a content item 465.

In some embodiments, the ablation experiment can be run in conjunction and/or by the training computing system 106. The exposure data (e.g., organic exposure data and third-party exposure data) as discussed above, can be used to aid the first machine-learned model in outputting the weights 108 which is processed to generate training samples (e.g., generated training data 112) used to train the second machine-learned model 118. For example, during the first stage 102, the training computing system 106 generates each training sample based at least in part on (i) a user descriptor or identifier, (ii) a timestamp of the exposure, (ii) an event descriptor or exposure descriptor, (iv) a timestamp of the next chronological exposure. (v) a count of customers performing specified target actions that occurred in the interval defined by the time of the exposure and the next exposure and (vi) any other appropriate features. In some implementations, multiple processors can be used to train the second machine-learned model 118. For example, model trainer 116 is used to train the second machine-learned model 118.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A computer-implemented method, comprising:

obtaining session data descriptive of a plurality of user sessions, the plurality of user sessions respectively comprising an interaction with an input element rendered at a user device and a request for a resource associated with the input element;

obtaining, using a first machine-learned model, a plurality of weights associated with the plurality of user sessions by, for a respective user session of the plurality of user sessions:

inputting, to the first machine-learned model, data descriptive of one or more characteristics of the respective user session; and obtaining, from the first machine-learned model, a respective weight of the plurality of weights, the respective weight indicative of an incremental probability of the request for a resource conditioned on rendering of the input element;

determining the incremental probability of the request conditioned on rendering of the input element is below a threshold incremental probability; and updating, based on the plurality of weights, a second machine-learned model to optimize candidate proposals for participation in a real-time content selection process for populating a user interface with one or more selected input elements, wherein updating the second machine-learned model comprises:

training the second machine-learned model using the respective weight to adjust future candidate proposals; and de-prioritizing, based on the incremental probability being below the threshold incremental probability, candidate proposals for participation in the real-time content selection process for populating the user interface with the input element.

2. The computer-implemented method of claim 1, wherein updating, based on the plurality of weights, the second machine-learned model comprises:

determining, based on the plurality of weights, one or more parameters of the first machine-learned model; and calibrating, using the one or more parameters, the second machine-learned model.

3. The computer-implemented method of claim 1, wherein updating, based on the plurality of weights, the second machine-learned model comprises:

generating, based on the plurality of weights, a semi-supervised training dataset comprising session data descriptive of the plurality of user sessions; and training, using the semi-supervised training dataset, the second machine-learned model.

4. The computer-implemented method of claim 1, wherein the respective weight corresponds to a reward for updating the second machine-learned model.

5. The computer-implemented method of claim 3, wherein the data indicative of one or more characteristics of the respective user session comprises at least one of: device data and input element data.

6. The computer-implemented method of claim 5, wherein the device data comprises at least one of a browser type, a device identifier, or data indicative of an account associated with the user device.

7. The computer-implemented method of claim 5, wherein the input element data comprises at least one of a form of the input element, a subject matter of the input element, one or more visual characteristics of the input element, or one or more audio characteristics of the input element.

8. The computer-implemented method of claim 2, wherein the one or more parameters comprise a value indicative of at least one of: one or more total effects, one or more impression query effects, one or more click query effects, one or more calibrated content effects, one or more impression content effects, or one or more click content effects.

9. The computer-implemented method of claim 8, wherein the plurality of user sessions are associated with at least one of a first user group, a second user group, and a third user group, wherein the first user group comprises one or more user sessions associated with no rendering of a user input element associated with a first content provider;

wherein the second user group comprises one or more user sessions associated with the rendering of a user input element associated with the first content provider on a user interface and not obtaining data indicative of a user interacting with the user input element; and wherein the third user group comprises one or more user sessions associated with the rendering of a user interface element associated with the first content provider and obtaining data indicative of a user interacting with the user interface element.

10. The computer-implemented method of claim 9, wherein the one or more parameters are indicative of the one or more impression query effects, corresponding to a difference in conversion probability associated with the second user group and the first user group.

11. The computer-implemented method of claim 9, wherein the one or more parameters are indicative of the one or more click query effects, corresponding to a difference in conversion probability associated with the third user group and the second user group.

12. The computer-implemented method of claim 10, wherein the one or more calibrated content effects are determined by taking the difference between a first total effect of the one or more total effects and a sum of a first impression query effect of the one or more impression query effects and a first click query effect of the one or more click query effects.

13. The computer-implemented method of claim 8, wherein a first total effect is equal to a sum of a first impression query effect of the one or more impression query effects, a first click query effect of the one or more click query effects, and a first calibrated content effect of the one or more calibrated content effects.

14. The computer-implemented method of claim 1, determining the incremental probability of the request conditioned on rendering of the input element is above a threshold incremental probability; and updating, based on the incremental probability being above the threshold incremental probability, the second machine-learned model to generate proposals for participation in the real-time content selection process for populating the user interface with the input element.

15. The computer-implemented method of claim 1, comprising:

transmitting, to a user computing device, data to cause the input element to be rendered on a user interface;

obtaining data indicative of user interaction with the input element; and updating the second machine-learned model based on the data indicative of the user interaction with the input element.

16. The computer-implemented method of claim 1, wherein the one or more characteristics of the respective user session comprises at least one of (i) a user identifier, (ii) a timestamp of an exposure, (ii) an exposure descriptor, (iv) a timestamp of a next chronological exposure, or (v) a count of users performing specified target actions that occurred in an interval defined by the time of the exposure and the next chronological exposure.

17. A Computing system, comprising:

one or more processors; and one or more non-transitory computer-readable media storing instructions that are executable to cause the one or more processors to perform operations, the operations comprising:

obtaining session data descriptive of a plurality of user sessions, the plurality of user sessions respectively comprising an interaction with an input element rendered at a user device and a request for a resource associated with the input element;

obtaining, using a first machine-learned model, a plurality of weights associated with the plurality of user sessions by, for a respective user session of the plurality of user sessions:

inputting, to the first machine-learned model, data descriptive of one or more characteristics of the respective user session; and obtaining, from the first machine-learned model, a respective weight of the plurality of weights, the respective weight indicative of an incremental probability of the request for a resource conditioned on rendering of the input element;

determining the incremental probability of the request conditioned on rendering of the input element is below a threshold incremental probability; and updating, based on the plurality of weights, a second machine-learned model to optimize candidate proposals for participation in a real-time content selection process for populating a user interface with one or more selected input elements, wherein updating the second machine-learned model comprises:

training the second machine-learned model using the respective weight to adjust future candidate proposals; and de-prioritizing, based on the incremental probability being below the threshold incremental probability, candidate proposals for participation in the real-time content selection process for populating the user interface with the input element.

18. One or more non-transitory computer readable media storing instructions that are executable by one or more processors to perform operations comprising:

obtaining session data descriptive of a plurality of user sessions, the plurality of user sessions respectively comprising an interaction with an input element rendered at a user device and a request for a resource associated with the input element;

obtaining, using a first machine-learned model, a plurality of weights associated with the plurality of user sessions by, for a respective user session of the plurality of user sessions:

inputting, to the first machine-learned model, data descriptive of one or more characteristics of the respective user session; and obtaining, from the first machine-learned model, a respective weight of the plurality of weights, the respective weight indicative of an incremental probability of the request for a resource conditioned on rendering of the input element;

determining the incremental probability of the request conditioned on rendering of the input element is below a threshold incremental probability; and updating, based on the plurality of weights, a second machine-learned model to optimize candidate proposals for participation in a real-time content selection process for populating a user interface with one or more selected input elements, wherein updating the second machine-learned model comprises:

training the second machine-learned model using the respective weight to adjust future candidate proposals; and de-prioritizing, based on the incremental probability being below the threshold incremental probability, candidate proposals for participation in the real-time content selection process for populating the user interface with the input element.

* * * * *